March 10, 1931. E. McCREE 1,795,569
BARREL FOR FOUNTAIN PENS AND METHOD OF MAKING
Filed Aug. 28, 1926
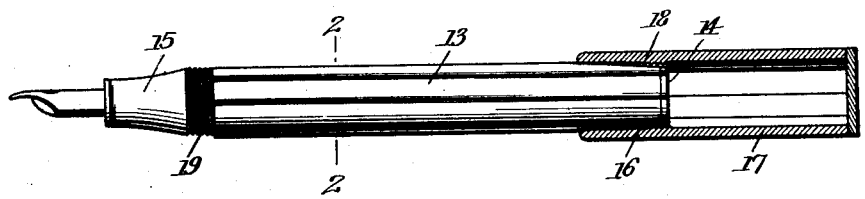
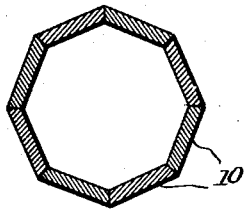
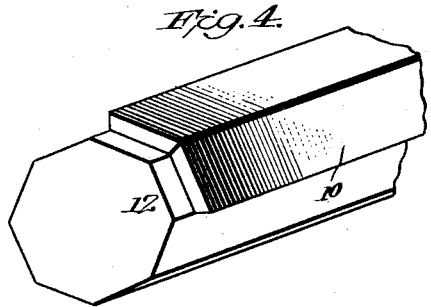
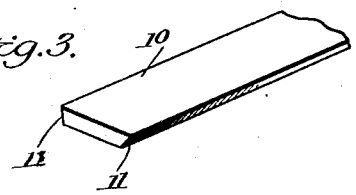
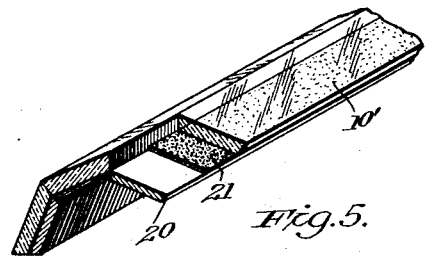
Inventor
Eben McCree
By John V. Sadley
Attorney Patented Mar. 10, 1931

1,795,569

UNITED STATES PATENT OFFICE

EBEN McCREE, OF ARLINGTON, NEW JERSEY

BARREL FOR FOUNTAIN PENS AND METHOD OF MAKING

Application filed August 28, 1926. Serial No. 132,162.

Heretofore in the manufacture of bodies for writing instruments, such for instance, as barrels for fountain pens, there has been a very high percentage of wasted material. According to the usual procedure, bars of suitable material are bored longitudinally and this results in the loss of about 90% of the material in the borings.

According to the present invention this method is entirely discarded, and by the method of procedure which I shall describe, I eliminate the element of waste entirely. Briefly, my invention consists in forming the material such as rubber, pyroxylin, celluloid, casein, galalith, etc., into sheets, cutting the sheets into narrow strips, and laterally uniting the strips to form the tubular unit. By bonding the strips in the manner which I shall describe, the resultant product is to all effects an integral unit and has all the requisite characteristics, such as strength and tightness.

Outside of the feature of economy, it is possible in practicing my invention to secure artistic effects impossible under the old method. The sheets of material may contain various coloring matters to secure desired effects, or the barrels may be built up of strips of various colors. In this manner any color combination such as school or club colors may be produced.

As illustrating an article produced in accordance with my invention, I have shown in the attached drawings, a fountain pen. It is to be understood, however, that this showing is not intended to be restrictive of the invention which includes bodies for writing instruments of all kinds.

In the drawings:

Figure 1 is a side elevation of the pen with the cap shown in section.

Figure 2 is a section on the line 2—2 of Figure 1.

Figure 3 shows a strip as cut from the sheet.

Figure 4 illustrates the manner of assembling the strips; and

Figure 5 shows several strips of a modified form.

For clearness of illustration, Figures 2 to 5 are enlarged views.

As the first step, the selected material is brought into the form of sheets of suitable thickness, whereupon, by means of a gear cutter or other suitable instrumentality, the sheets are cut into narrow strips, such as 10 in Figure 3, the lateral edges of the strips being beveled as at 11, during the cutting operation. I propose to make the barrel of polygonal form, and consequently, the angle of bevel will depend on the number of sides which the barrel is to have, and also, upon the desired perimeter. The strips thus prepared are placed upon a mandrel 12, which latter is of the desired polygonal form. After the strips have been placed around the mandrel with their lateral edges in contact, they are held thus by any suitable means, such, for instance, as rubber bands and the mandrel is withdrawn. Retaining the strips in this condition of assembly, I now introduce into the interior of the tube a suitable solvent, the nature of which will, of course, depend upon the nature of the material of which the strips are composed. When using pyroxylin strips, for instance, a suitable solvent would be amyl acetate, or ethyl acetate, or their equivalents. The solvent enters between the contiguous edges of the strips and its function is to render these edges temporarily plastic, so that they will inter-merge, thus bonding the strips together to form an integral unit, this action taking place at normal room temperature without any special application of heat. Any excess solvent is quickly removed and the tube is placed away for a short time in order that the joints may harden completely. Eventually the tube may be cut up into suitable lengths as 13, Figure 1. A cap 14 is bonded on one end of the barrel and a writing-head 15 is inserted in the opposite end in the usual manner. The end of the barrel is rounded off as indicated at 16 of Figure 1, in order to receive the cap 17 more readily, this latter being constructed in the same manner as the barrel. The strips for the cap I have provided with portions 18 of somewhat greater thickness than the main portions of the strips. These thicker portions are intended to receive the threads which are adapted to engage threads 19 of the head 15.

The method I have described of bonding the strips together to form an integral unit, has the further advantage of eliminating all visible lines of juncture between the strips, and a barrel thus formed, cannot be distinguished on these grounds from one which has been moulded or tooled from a single piece of material.

Some of the composites which it may be desired to use are of brittle or otherwise delicate nature and these I reinforce by means of stronger strips 20, Figure 5, united with strips 10' by means of cement. This union is effected while the materials are still in sheet form and under pressure so that the laminations are rigidly bonded together, and the resultant sheets are subsequently cut into strips in the manner described above.

In case strips 10' are of transparent or translucent material, it may be desirable to insert between them and backing strips 20, strips 21 of decorative value. In such case, the strips are all united in the manner mentioned.

A barrel constructed in the manner set forth is fully self-sustaining and does not require any reinforcing bands or the like. I am aware that in general, veneering has been applied to polygonal objects in much the manner which I have described, but I believe it is without precedent in the art to build up self-sustaining tubular units in the manner and for the purpose described. The term "barrel" as used in the following claims refers to the body proper of a writing instrument and excludes the idea of a separate interior tube liner. Even should a hollow mandrel be used during the arrangement of the strips, it would be entirely removed since the described barrel is completely self-sustaining.

I claim:

1. The method of forming barrels for writing instruments, consisting in arranging a series of strips in lateral contact and tubular formation, and rendering the compacting edges of the strips temporarily plastic by means of a solvent applied at ordinary room temperature for bonding them together.

2. The method of forming barrels for writing instruments consisting in cutting a number of similar strips from a sheet of suitable material, the strips being cut to have lateral edges beveled at predetermined angles, applying the strips around a mandrel to bring their beveled edges into contact and form a tube, removing the mandrel while retaining the strips in tubular formation, and applying a solvent at ordinary room temperature, to the contacting edges for rendering them temporarily plastic and causing their inter-merging, for the purpose described.

3. The method of forming barrels for writing instruments, which consists in uniting a decorative intermediate sheet with a translucent facing sheet and a reinforcing backing sheet, cutting the resultant laminated sheet into strips, and laterally bonding said strips together in tubular formation to form a self-sustaining unit.

4. A barrel for writing instruments, consisting of strips of translucent material backed with strips of decorative value and laterally bonded together to form a self-sustaining unit.

5. A barrel for writing instruments, consisting of strips of translucent material backed with strips of decorative value and reinforcing strips, and laterally bonded together to form a self-sustaining unit.

6. The method of forming barrels for writing instruments, which consists in fabricating laminated strips having a translucent facing lamina and a decorative backing lamina, arranging a series of the strips in lateral contact to form a tubular body, and rendering the contacting edges of the strips temporarily plastic by means of a solvent applied at ordinary room temperature for bonding the strips together into a self-sustaining unit.

In testimony whereof I have hereunto set my hand.

EBEN McCREE.